Patented Mar. 7, 1944

2,343,311

UNITED STATES PATENT OFFICE

2,343,311

HALOSTEROID AND PREPARATION OF THE SAME

Russell Earl Marker, State College, Pa., and Harry M. Crooks, Jr., Detroit, Mich., assignors to Parke, Davis & Company, Detroit, Mich., a corporation of Michigan No Drawing. Original application September 4, 1941, Serial No. 409,590. Divided and this application September 28, 1942, Serial No. 460,000

6 Claims. (Cl. 260—397.4)

This invention relates to halosteroids and preparation of the same.

More particularly this invention relates to halosteroids which are useful as intermediates for the preparation of androstane derivatives.

This application is a division of our copending application, Serial No. 409,590, filed September 4, 1941, in which the preparation of 17,21-dihalosteroids is described and claimed.

This application relates to the preparation of another new class of halosteroids, isomeric with and similar to the 17,21-dihalo-20-keto-pregnane compounds, namely, the 16,17-dihalo-20-keto-pregnane compounds representably by the formula

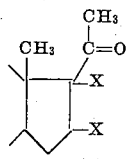

where X is chlorine or bromine. These 16,17-dihalo-20-keto-pregnane compounds are prepared by the reaction of chlorine or bromine on $\Delta^{16}$-20-keto-pregnene compounds. This reaction takes place quickly and smoothly at room temperature, or indeed, below room temperature, and a catalyst is not necessary. It is preferable to conduct the reaction in a solvent inert to elementary halogen, such as acetic acid, carbon tetrachloride, nitrobenzene, etc.

The reaction is illustrated by the following diagram:

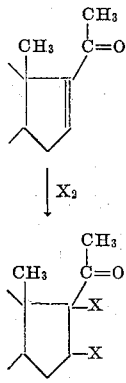

The above transformation in ring D takes place regardless of the nature of the substitutes in rings A, B and C of the $\Delta^{16}$-20-keto-pregnene compound which is halogenated. This does not imply, however, that rings A, B and C are necessarily unaffected during the halogenation, for if certain reactive groupings, such as carbon-to-carbon double bonds or ketone groupings, are present in rings A, B and C, the halogen may act at these points as well as on the structural grouping at ring D.

The chemical reactions of the 16,17-dihalo-20-keto-pregnane compounds are closely analogous to the reactions of the 17,21-dihalo-20-keto-pregnane compounds:

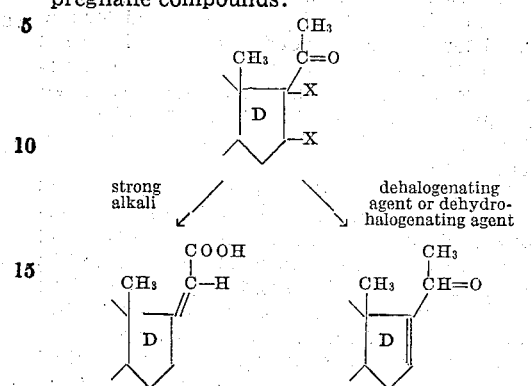

The transformation of a 16,17-dihalo-20-keto-pregnane compound into the $\Delta^{17}$-21-pregnenoic acid is best effected by an excess of strong alcoholic alkali. For example, there may be used methanolic potassium hydroxide, ethanolic sodium hydroxide or a solution of sodium in propyl alcohol. There is also frequently formed, besides the $\Delta^{17}$-21-pregnenoic acid, a relatively small amount of the ester of the $\Delta^{17}$-21-pregnenoic acid and the alcohol used as a solvent.

The action of dehydrogenating agents on 16,17-dihalo-20-keto-pregnane compounds leads to the formation of $\Delta^{16}$-unsaturated-20-keto-pregnane compounds. Dehalogenating agents which operate satisfactorily in this reaction include zinc and acetic acid or alcohol, sodium iodide in alcohol or acetone, and hydrogen in the presence of palladium and pyridine.

Surprisingly, dehydrohalogenating agents also react with 16,17-dihalo-20-keto-pregnane compounds to form $\Delta^{16}$-unsaturated-20-keto-pregnene compounds. Dehydrohalogenating agents operative in this manner include potassium acetate in acetic acid and also pyridine.

The invention is further illustrated by the following example:

EXAMPLE

A. 16,17-Dibromo-Pregnanol-3($\beta$)-one-20 Acetate

To a solution of 5 g. of $\Delta^{16}$-pregnenol-3($\beta$)-one-20 acetate in 200 cc. of acetic acid is added 14 cc. of a 1 M. solution of bromine in acetic acid. Then the mixture is diluted with water and the precipitated solid collected and crystallized from methanol. The product, M. P. 137–140° C., gives the following analysis:

Anal. calcd. for $C_{23}H_{34}O_3Br_2$: C, 53.3; H, 6.6. Found: C, 53.5; H, 6.7.

These analytical figures correspond to a dibromo-pregnanolone acetate. Accordingly it is believed that the above product is 16,17-dibromo-pregnanol-3(β)-one-20 acetate representable by the formula

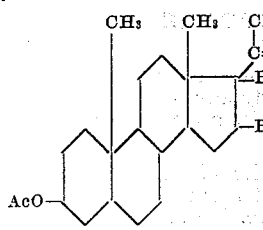

B. REACTION OF METHANOLIC POTASSIUM HYDROXIDE WITH 16,17-DIBROMO-PREGNANOL-3(β)-ONE-20 ACETATE

A solution of 5 g. of 16,17-dibromo-pregnanol-3(β)-one-20 acetate and 25 g. of potassium hydroxide in 1 liter of methanol is refluxed for one hour. Then water is added and the mixture is extracted with ether. In this way there is obtained two fractions which may be designated "the aqueous alkaline phase" and "the neutral ethereal phase." These two fractions are worked up as follows:

*a. The aqueous alkaline phase.*—The aqueous alkaline phase is acidified with dilute hydrochloric acid and extracted with ether. The ethereal solution is washed with water and evaporated to dryness. The crystalline residue is recrystallized from methanol to give 3(β)-hydroxy-$\Delta^{17}$-21-pregnenoic acid of M. P. 254–256° C. dec.

*b. The neutral ethereal phase.*—The neutral ethereal extract is evaporated to dryness and the crystalline residue is recrystallized from methanol. Thus there is obtained methyl 3(β)-hydroxy-$\Delta^{17}$-21-pregnenoate of M. P. 153–156° C.

What we claim as our invention is:

1. Process for the preparation of a halosteroid having at ring D the probable structure

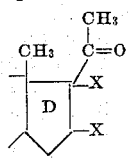

where X is a member of the class consisting of chlorine and bromine which comprises reacting a steroid having at ring D the structure

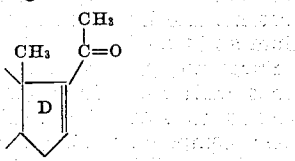

with a member of the class consisting of chlorine and bromine.

2. Process for the preparation of a halosteroid of the formula

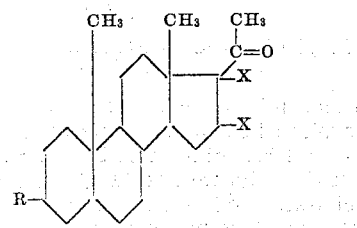

where X is a member of the class consisting of Cl and Br and R is a member of the class consisting of —OH and groups hydrolyzable to —OH which comprises reacting a steroid of the formula

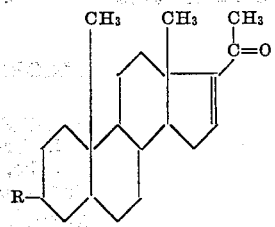

with a halogenating agent of the class consisting of chlorine and bromine.

3. Process for the preparation of a halosteriod of the formula

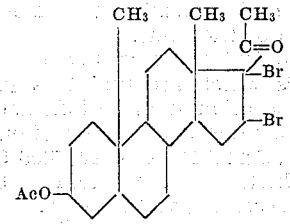

which comprises reacting a steriod of the formula

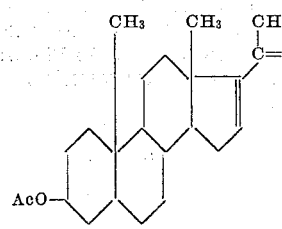

with bromine.

4. A halosteriod having in ring D the formula

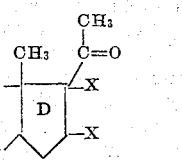

where X is a member of the class consisting of Cl and Br.

5. A halosteriod having the formula

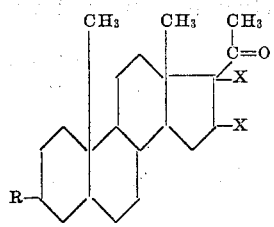

where X is a member of the class consisting of Cl and Br and R is a member of the class consisting of —OH and groups hydrolyzable to —OH.

6. A halosteriod of the formula

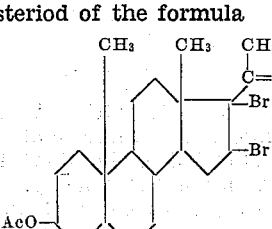

RUSSELL EARL MARKER.
HARRY M. CROOKS, JR.